United States Patent [19]

Kakii et al.

[11] Patent Number: 4,708,433

[45] Date of Patent: Nov. 24, 1987

[54] OPTICAL CONNECTOR AND METHOD OF MANUFACTURING A PAIR OF FERRULES THEREFOR

[75] Inventors: Toshiaki Kakii; Koichiro Matsuno; Shuzo Suzuki, all of Yokohama; Fumihiro Ashiya; Koushi Ishihara, both of Mito, all of Japan

[73] Assignees: Sumitomo Electric Industries, Ltd., Osaka; Nippon Telegraph & Telephone Corporation, Tokyo, both of Japan

[21] Appl. No.: 788,404

[22] Filed: Sep. 4, 1985

[30] Foreign Application Priority Data

Sep. 4, 1984 [JP] Japan .................... 59-186135
Sep. 4, 1984 [JP] Japan .................... 59-186136

[51] Int. Cl.⁴ .................... G02B 6/40; G02B 6/38
[52] U.S. Cl. .................... 350/96.22; 350/96.21
[58] Field of Search .................... 350/96.2, 96.21, 96.22

[56] References Cited

U.S. PATENT DOCUMENTS 4,470,660 9/1984 Hillegonds et al. .............. 350/96.21

FOREIGN PATENT DOCUMENTS 0105597 4/1984 European Pat. Off. .
2408844 11/1978 France .

OTHER PUBLICATIONS

Patents Abstracts of Japan, vol. 8, No. 204 (P-301), [1641], 18th Sep. 1984; JP-A-59 88 712.
Patents Abstracts of Japan, vol. 8, No. 121 (P-278), [1558], 7th Jun. 1984; & JP-A 59 28 113.
Patents Abstracts of Japan, vol. 3, No. 149 (E-157), 8th Dec. 1979, p. 6, E 157; & JP-A-54 127 337.
Patents Abstracts of Japan, vol. 4, No. 21 (E-172), 21st Feb. 1980, p. 111, E 172; & JP-A-54 160 248.

*Primary Examiner*—Eugene R. Laroche
*Assistant Examiner*—Steven J. Mottola
*Attorney, Agent, or Firm*—Cushman, Darby & Cushman

[57] ABSTRACT

An optical connector for joining exposed fiber ends of coated fibers and a method of manufacturing a pair of ferrules for the optical connector. The optical connector includes a pair of the ferrules each having a flange, the coated fiber and a metal pipe molded integrally with one another by using molding resin, a coupling pin fitted through holes of the ferrules, a sleeve for receiving the metal pipes of the ferrules, and a housing member for axially clamping the ferrules to each other.

5 Claims, 30 Drawing Figures

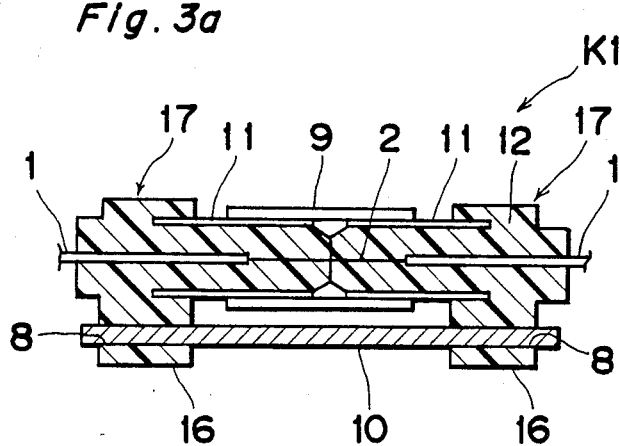
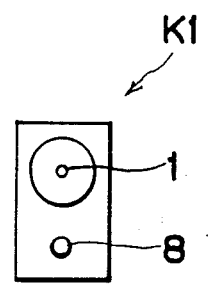
Fig. 3a  Fig. 3b
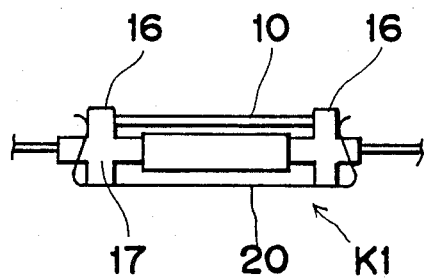
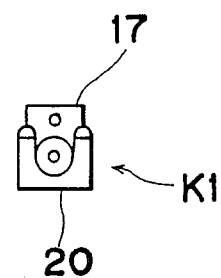
Fig. 4a  Fig. 4b

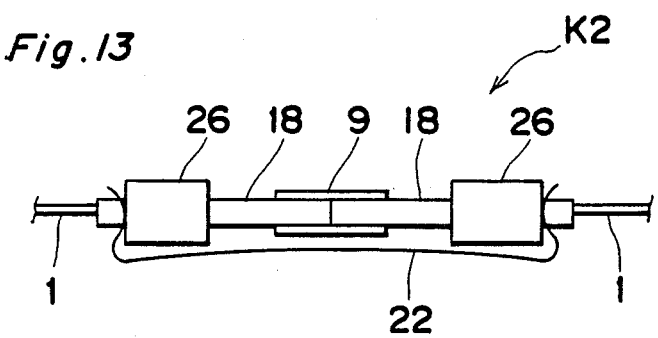
Fig.13
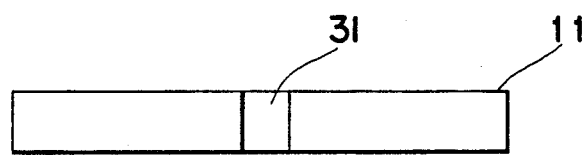
Fig.16a
Fig.16b
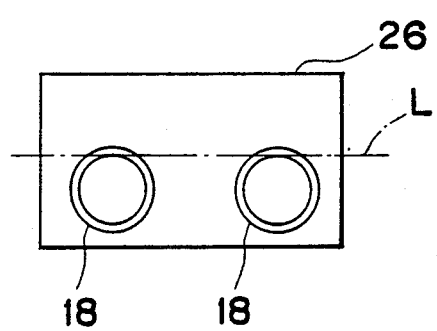
Fig.18
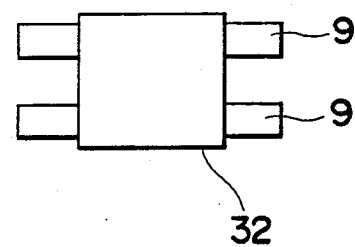
Fig.17

OPTICAL CONNECTOR AND METHOD OF MANUFACTURING A PAIR OF FERRULES THEREFOR

BACKGROUND OF THE INVENTION

The present invention generally relates to optical fibers and more particularly, to an optical connector for single-mode optical fibers required to be coupled with each other with high accuracy and a method of manufacturing a pair of ferrules for the optical connector.

Conventionally, in a single-fiber connector for a single-core coated fiber 1, it has been so arranged as shown in FIGS. 1a and 1b that a cylindrical ferrule 3 made of metal has a flange 6 and is formed, at its axis, with a stepped through-hole, i.e., a hole 5' and an aperture 5 having a diameter smaller than that of the hole 5' and extending in alignment with the hole 5'. The single-core coated fiber 1 is constituted by one single-mode optical fiber having a coating therearound, while an exposed fiber (glass portion) 2 is obtained by removing the coating from an end portion of the coated fiber 1. The coated fiber 1 and the exposed fiber 2 are, respectively, fitted into the hole 5' and the aperture 5 until the coated fiber 1 is blocked by a bottom face of the hole 5'. Subsequently, adhesive 4 is filled into a gap between the coated fiber 1 and the hole 5' and thus, the coated fiber 1 is secured to the ferrule 3. Thereafter, a portion of the exposed fiber 2, which projects out of a corresponding end face of the ferrule 3, is cut off from the exposed fiber 2 and then, the cut edge of the exposed fiber 2 received by the aperture 5 is finished by grinding so as to be flush with the end face of the ferrule 3 such that the end face of the ferrule 3 acts as a coupling face of the ferrule 3. Then, a sleeve having an inside diameter identical with an outside diameter of the ferrule 3 is prepared. Thus, a pair of the ferrules 3 each having the coated fiber 1 secured thereto are inserted into opposite ends of the sleeve, respectively until the respective coupling faces of the ferrules 3 are brought into contact with each other, so that the optical connector is obtained.

Meanwhile, for example, a single-mode optical fiber has an outside diameter of 125 $\mu$m but its core diameter is merely 10 $\mu$m, far smaller than the outside diameter of the optical fiber. Accordingly, the optical fiber is required to be positioned with an accuracy of not more than 1 $\mu$m. For example, in order to obtain a transmission loss of not more than 1 dB at the optical connector, an eccentricity of the aperture 5 relative to an outside diameter of, e.g., 2.5 mm of the ferrule 3 is required to be restricted to 1 $\mu$m at its maximum, thereby resulting in an extreme rise in production cost of the prior art optical connector.

Furthermore, even if the eccentricity of the aperture 5 relative to the outside diameter of the ferrule 3 is restricted to not more than 1 $\mu$m, the transmission loss at the optical connector exceeds 1 dB when an eccentricity of a core of the optical fiber relative to a cladding of the optical fiber is more than 1 $\mu$m. Therefore, in order to prevent such a phenomenon, the outside diameter of the ferrule 3 is required to be subjected to grinding coaxially with the core of the exposed fiber 2, but such grinding leads to low productivity rate and high production cost of the known optical connector.

Meanwhile, as shown in FIGS. 2a and 2b, in a prior art multi-fiber connector for a multicore coated fiber 1 having multiple, e.g., five optical fibers, a rectangular ferrule 7 is formed with a pair of guide holes 8, each for receiving a coupling pin. In the same manner as the known ferrule 3 of FIG. 1, the multiple optical fibers are, respectively, fitted into stepped through-holes arranged linearly so as to be disposed between the guide holes 8 and then, the coated fiber 1 is secured to the ferrule 7. Thereafter, the end face of the ferrule 7, out of which the exposed fibers 2 project, are ground into a coupling face of the ferrule 7. After the respective coupling faces of a pair of the ferrules 7 have been brought into contact with each other, a pair of the coupling pins are inserted through one pair of the confronting guide holes 8 of the confronting ferrules 7 and the other pair of the confronting guide holes 8 of the confronting ferrules 7, respectively so as to position the confronting ferrules 7. Subsequently, the confronting ferrules 7 positioned by a pair of the coupling pins are clamped by a clamp housing and thus, the optical connector is obtained. However, this known optical connector has such a drawback that the apertures 5 for receiving the exposed fibers 2, respectively are required to be machined with high positional accuracy relative to the guide holes 8, thereby resulting in rise of its production cost.

Moreover, the known ferrules 3 and 7 require areas of about 5 mm$^2$ and about 10 mm$^2$ per optical fiber, respectively, which are approximately ten times a cross-sectional area of about 0.6 mm$^2$ of the coated fiber 1, thus preventing the known optical connectors of FIGS. 1 and 2 from being made compact in size.

It should be noted here that the exposed fiber 2 obtained by removing the coating from the coated fiber 1 means generally a "bare optical fiber" and removal of the coating means "removal of only a coating for making positioning of the optical fiber unstable". Accordingly, for example, a thin film of 1 to 10 $\mu$m in thickness coated on a surface of the bare optical fiber is not required to be removed. Furthermore, even if a coating layer has a thickness of as large as 200 $\mu$m, it is needless to say that the coating layer is not required to be removed if the coating layer is sufficiently brought into close contact with the bare optical fiber without adversely effecting positioning of the optical fiber at all.

SUMMARY OF THE INVENTION

Accordingly, an essential object of the present invention is to provide an optical connector which is highly accurate and minimizes a transmission loss, with substantial elimination of the disadvantages inherent in conventional optical connectors of this kind.

Another important object of the present invention is to provide an optical connector of the above described type, which is simple in structure and suitable for mass production at low cost.

Still another object of the present invention is to provide a method of manufacturing a pair of ferrules for the above described optical connector, which produces a high productivity rate.

In order to accomplish these objects of the present invention, in an optical connector according to a first embodiment of the present invention, a coated fiber having an exposed fiber obtained by removing a coating from a portion of the coated fiber is set in a die and an integrally molded item having a pair of ferrules to be split at the exposed fiber is produced by using molding resin, while a hole for receiving a coupling pin for defining a fitting position of each of the ferrules is formed on each of the ferrules. After the molding, the integrally molded item is split into the two ferrules. Since the two separated ferrules can be coupled with each other accurately at a relative position identical with that occupied at the time of molding of the ferrules, the cores of the optical fibers to be joined to each other can be brought into alignment with each other remarkably easily.

Furthermore, in a multi-fiber connector for joining end portions of optical fibers, according to a second embodiment of the present invention, each of a pair of ferrules to be coupled with each other through a sleeve includes a plurality of coupling portions. An integrally molded item molded by using molding resin after insertion of the coated fiber through a metal pipe is produced so as to be split into a pair of the ferrules.

BRIEF DESCRIPTION OF THE DRAWINGS

These objects and features of the present invention will become apparent from the following description taken in conjunction with the preferred embodiments thereof with reference to the accompanying drawings, in which:

FIGS. 3a and 3b are a longitudinal sectional view and a front elevational view of a single-fiber connector according to a first embodiment of the present invention, respectively;

FIGS. 4a and 4b are a side elevational view and a front elevational view of the optical connector of FIG. 3 clamped by a clamp housing, respectively;

FIG. 13 is a schematic view indicative of assembly of the optical connector of FIG. 10;

FIGS. 16a and 16b are a top plan view and a side elevational view of a modified pipe employed in the ferrule of FIG. 11, respectively;

FIG. 17 is a view of a housing molded integrally with sleeves employed in the optical connector of FIG. 10; and FIG. 18 is a view similar to FIG. 11, particularly showing a modification thereof.

Before the description of the present invention proceeds, it is to be noted that like parts are designated by like reference numerals throughout several views of the accompanying drawings.

DETAILED DESCRIPTION OF THE INVENTION

Figure 1A:
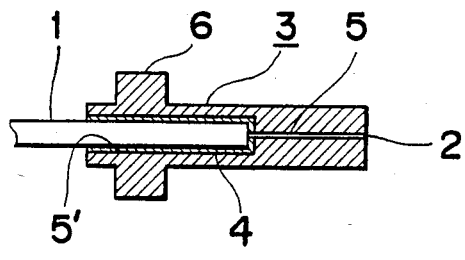
FIGS. 1a and 1b are a longitudinal sectional view and a front elevational view of a ferrule of a prior art single-fiber connector for a single-mode optical fiber, respectively (already referred to)
Figure 1B:
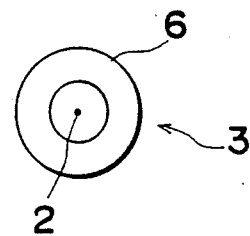

Referring now to the drawings, there is shown in FIGS. 3a and 3b, a single-fiber connector K1 for a single-core coated fiber 1, according to a first embodiment of the present invention. The optical connector K1 includes a pair of ferrules 17 of substantially cylindrical shape. Each of the ferrules 17 is provided with a metal pipe 11 and a rectangular flange 16 and has a hole 8 formed on the flange 16. An exposed fiber 2 is obtained by removing a coating from a portion of the coated fiber 1. After the exposed fiber 2 has been inserted into the metal pipe 11, the exposed fiber 2 is integrally molded with the metal pipe 11 by molding resin 12. Accordingly, the flange 16 formed with the hole 8 is integrally molded with the metal pipe 11. Since the bore of the metal pipe 11 is filled with the molding resin 12, the exposed fiber 2 is secured in position.

A pair of the ferrules 17 each having the exposed fiber 2 molded therewith are, respectively, inserted into opposite ends of a sleeve 9 so as to be fitted into the sleeve 9 such that confronting end faces of the ferrules 17 are brought into contact with each other. Subsequently, a coupling pin 10 is fitted through the holes 8 of the confronting ferrules 17 so as to radially position the confronting ferrules 17, so that the optical connector K1 is obtained.

The optical connector K1 further includes a clamp housing 20 for axially clamping the confronting ferrules 17 to each other as shown in FIG. 4. The clamp housing 20 is formed by an elastic metal plate so as to axially clamp the flanges 16 of the confronting ferrules 17 to each other. The clamp housing 20 is of one-piece construction but may be replaced by any clamp member constituted by a plurality of components. Such clamp member can also be employed for radially clamping the ferrules 17.

Hereinbelow, a method of manufacturing the ferrules 17 for the optical connector K1, according to the present invention will be described with reference to FIG. 5. A molding die 13 for molding the two ferrules 17 of the optical connector K1 simultaneously is composed of two die portions split in its longitudinal direction. Meanwhile, a pour-spout, runners, etc. of the molding die 13 are not illustrated for the sake of brevity. One coated fiber 1 having the exposed fiber 2 is inserted through the confronting metal pipes 11. Thereafter, a clamp member 14 split into two halves is interposed between the confronting metal pipes 11 and is bonded to the confronting end faces of the confronting metal pipes 11. Subsequently, the coated fiber 1 having the exposed fiber 2 is set in the molding die 13 coaxially with the confronting metal pipes 11 aligned axially with each other such that the coated fiber 1 extends out of opposite ends of the molding die 13. At the same time, in order to form the longitudinally extending holes 8 on the flanges 16 of the confronting ferrules 17, respectively, a molding pin 15 is set in a corresponding portion of the molding die 13 in parallel with the axially aligned metal pipes 11. After the two die portions of the molding die 13 have been clamped to each other, integral molding of the ferrules 17 is performed by using the molding resin 12, for example, epoxy resin. Thus, an integrally molded item including the two ferrules 17 having the coated fiber 1 secured thereto is obtained. In the molded item, the metal pipe 11 is integrally molded with the flange 16 and the flange 16 is formed with the hole 8, while the bore of the metal pipe 11 is filled with the molding die 12 in the same manner as the flange 16. Thereafter, the molded item is released from the molding die 13 and then, the molding pin 15 is withdrawn from the molded item. Then, the molded item is split into the two ferrules 17 by, for example, cutting the exposed fiber 2, i.e., a central portion of the molded item, whereby a pair of the ferrules 17 for the optical connector K1 can be obtained simultaneously.

Figure 5:
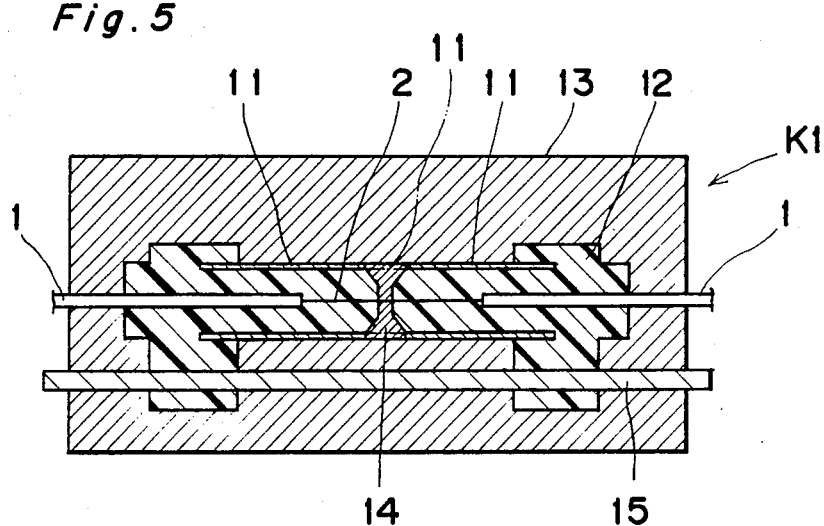
FIG. 5 is a view explanatory of a method of the present invention of manufacturing a pair of ferrules of the optical connector of FIG. 3.
Figure 6:
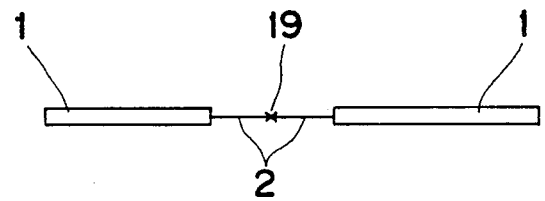
FIG. 6 is a view explanatory of fusion bonding of exposed fibers coupled by the optical connector of FIG. 3.

In the method of the present invention shown in FIG. 5, one coated fiber 1 having the exposed fiber 2 obtained by removing the coating from the coated fiber 1 is employed but can be replaced by one coated fiber 1 of FIG. 6 which is obtained by fusion bonding opposite ends 19 of two exposed fibers 2 of respective two coated fibers 1.

Figure 7A:
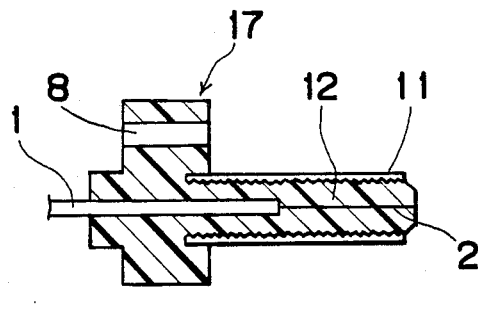
FIGS. 7a and 7b are a longitudinal sectional view and a front elevational view of a modified ferrule employed in the optical connector of FIG. 3, respectively.
Figure 7B:
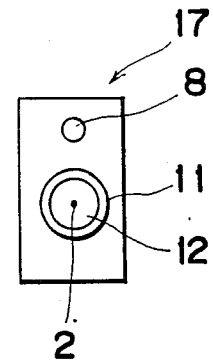

Furthermore, if the metal pipe 11 is formed, at e.g., an inner periphery or inner and outer peripheries thereof, with indentations or threads as shown in FIG. 7, a contact area between the metal pipe 11 and the molding die 12 increases and thus, it becomes possible to prevent the molding die 12 and the metal pipe 11 from being separated from each other.

Figure 8:
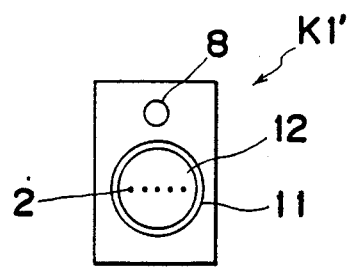
FIGS. 8 and 9 are views similar to FIG. 3b, particularly showing modifications thereof, respectively.
Figure 9:
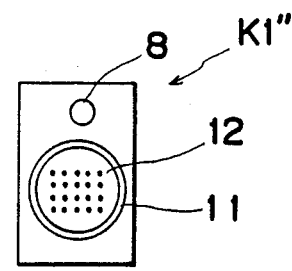

In the foregoing description, the single-core coated fiber 1 is employed in the optical connector K1. However, it is needless to say that the present invention can also be applied to multicore coated fibers having, for example, five and 20 optical fibers, respectively as shown in FIGS. 8 and 9. In the case of a first modified optical connector K1' of FIG. 8, the multicore coated fiber having five optical fibers is inserted through the confronting metal pipes 11 by using a molding die similar to the above described molding die 13 such that the five optical fibers are arranged in parallel with one another and then, integral molding of the two ferrules of the optical connector K1' is performed by using the molding resin 12. Thus, each of the ferrules of the optical connector K1' is formed with the hole 8.

Meanwhile, in the method of the present invention shown in FIG. 5, two metal pipes 11 are integrally molded with the flanges 16 of the confronting ferrules 17 but can be replaced by one metal pipe 11 of a proper length as shown by imaginary lines in FIG. 5. In this case, the coated fiber 1 having the exposed fiber 2 is supported coaxially with the metal pipe 11 and then, integral molding of the confronting ferrules 17 is performed by the molding resin 12. It is needless to say that this arrangement can also be applied to multicore coated fibers. Then, the integrally molded item thus obtained is split into the two ferrules 17 by cutting the metal pipe 11. Subsequently, the cut faces of the metal pipe 11 are machined so as to finish the cut edges of the exposed fibers 2 and thus, the coupling faces of the respective ferrules 17 are produced. In this case, the hole 8 for receiving the coupling pin 10 is likewise formed on the flange 16 of each of the ferrules 17 at the time of the integral molding in order to radially position the confronting ferrules 17 accurately.

Then, dimensions and configurations of one example of the ferrule 17 of the present invention are described. The ferrule 17 has such configurations as shown in FIG. 3. The metal pipe 11 has an outside diameter of 2.5 mm. Meanwhile, the flange 16 is of rectangular shape and has a thickness of 6 mm. The hole 8 has a diameter of 1 mm. The metal pipe 11 is formed with internal threads so as to be fitted into the sleeve 9. A portion of the metal pipe 11, which is fitted into the sleeve 9, has a length of about 8 mm. Furthermore, the flange 16 has a length of above 6.5 mm and a width of about 4.5 mm. The ferrule 17 is of an overall length of 18 mm. At the time of manufacture of the ferrule 17, a single-mode coated fiber 1, which is fusion bonded as shown in FIG. 6, was employed. A transmission loss due to the fusion bonding is 0.04 dB on the average. The exposed fiber 2 has a length of about 10 mm. As described earlier, a pair of the metal pipes 11 having the coated fiber 1 inserted therethrough are set in the molding die 13 and, at the same time the molding pin 15 is also set in the molding die 13. Subsequently, the two die portions of the molding die 13 are clamped to each other and then, integral molding of the ferrules 17 is performed by using epoxy resin usable for low-pressure molding. The integral molding is performed at a molding pressure of 20 kg/cm$^2$ and at a molding temperature of 170° C. for five minutes. Thereafter, the integrally molded item is released from the molding die 13. Then, the molding pin 15 is withdrawn from the integrally molded item. The molded item is cut at its two locations interposing therebetween the central portion of the molded item, i.e., the fusion bonding point 19 of the exposed fiber 2. Then, the cut faces of the ferrules 17 thus obtained are ground so as to finish the cut edges of the exposed fibers 2. In consideration of the mold shrinkage factor, the molding pipe 15 is formed slightly larger, in size, than the coupling pin 10. A transmission loss due to coupling of the ferrules 17 by using the sleeve 9 and the coupling pin 10 was 0.57 dB on the average of a total of 20 samples and was 0.87 dB at its maximum. These values of the transmission loss are substantially similar to those of multimode optical connectors. Therefore, it will be readily understood that the optical connector of the present invention is fully suitable for practical use. Meanwhile, in this example, a split sleeve was employed as the sleeve 9 but may be replaced by an unsplit precision sleeve. Furthermore, the two exposed fibers 2 coupled with each other at the fusion bonding point 19 were employed in this example but can be replaced by the exposed fiber 2 obtained by partially removing the coating from the coated fiber 1.

In the above described embodiment, the single-mode optical fiber is mainly employed. However, it will be apparent that the present invention can be applied to a multimode optical fiber or a multi-fiber connector for a multicore coated fiber as referred to earlier. As is clear from the foregoing description, in the optical connector according to the first embodiment of the present invention, the metal pipes having the coated fibers inserted therethrough and the molding pin are set in the molding die so as to produce the integrally molded item and then, the molded item is cut into a pair of the ferrules each having the coated fiber. Therefore, if the ferrules are fitted into the sleeve and the coupling pin is inserted through the holes of the respective ferrules, it becomes possible to join the cores of the optical fibers accurately at a relative position identical with that occupied at the time of molding of the ferrules. Accordingly, in accordance with the present invention, such a need associated with the prior art optical connectors can be eliminated that the outside diameter of the ferrule is ground coaxially with the core of the optical fiber.

Meanwhile, in accordance with the present invention, a pair of the ferrules each having the coated fiber required to be coupled highly accurately can be easily manufactured quickly by the integral molding using the molding resin, thereby remarkably improving the productivity and reducing production cost of the ferrules.

Furthermore, in accordance with the present invention, since the ferrule has the metal pipe provided on its outer periphery, irregularity of the outside diameter of the ferrule can be drastically eliminated as compared with a ferrule composed wholly of the molding resin and the ferrule has an increased bending strength of not less than 8 kg on the average. Since the ferrule is provided with the metal pipe to be fitted into the sleeve, the ferrule has such excellent wear resistance at the time of fitting of the ferrule into the sleeve and detaching of the ferrule from the sleeve that variations in transmission loss after the ferrule has been fitted into or detached from the sleeve 1,000 times are ±0.2 dB or less, thereby resulting in fairly excellent coupling reproducibility of the single-mode optical connector.

Meanwhile, in accordance with the present invention, if the fusion bonding point of the exposed fiber is set at the clamp member for clamping the exposed fiber in a process of cutting the integrally molded item after integral molding of the fusion bonded exposed fiber, a distance between the confronting metal pipes is determined by the clamp member. Therefore, by the process of cutting the integrally molded item after the integral molding, it becomes possible to remove the fusion bonding point without fail and thus, the fusion bonding point of the exposed fiber is advantageously removed from the ferrule.

Moreover, in accordance with the present invention, if the integrally molded item is manufactured by using a single metal pipe without using two metal pipes, the single metal pipe can be set in the molding die more easily than the two metal pipes. If the integrally molded item having the single metal pipe is cut, at its portion corresponding to the exposed fiber, into a pair of the ferrules, the ferrules thus obtained function in the same manner as those obtained by using the two metal pipes.

Figure 15:
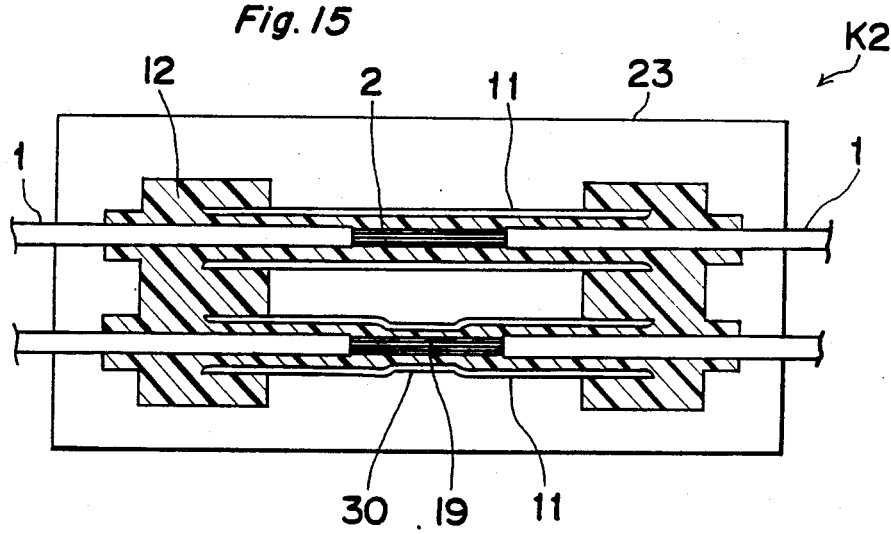
FIG. 15 is a view explanatory of a method of the present invention of manufacturing a pair of the ferrules of FIG. 11.

Referring now to FIGS. 10 to 13, there is shown a multi-fiber connector K2 according to a second embodiment of the present invention. The optical connector K2 includes a pair of ferrules 27. Each of the ferrules 27 is provided with a plurality of, for example, two coupling portions 18 each formed by a metal pipe 11 (FIG. 15) and has a rectangular flange 26. Each of the ferrules 27 further has a portion 26' from which two multicore coated fibers 1 each having multiple, e.g., three optical fibers are inserted. Each of the ferrules 27 is formed by the two coated fibers 1, the flange 26, the portion 26', etc. which are molded integrally with one another by using molding resin 12 (FIG. 15). In this embodiment, the coated fibers 1 each having multiple exposed fibers 2 are secured to a pair of the ferrules 27 by the molding resin 12 in a molding die to be described later such that the exposed fibers 2 are disposed in the metal pipe 11. In this embodiment, the multicore coated fibers 1 are of tape type but can be replaced by multicore coated fibers of any type. For example, it can be also so arranged that one of the two ferrules 27 is provided with multicore coated fibers and the other one of the ferrules 27 is provided with assemblies each having a plurality of single-core coated fibers.

In each of the ferrules 27, the multiple exposed fibers 2 are secured to each of the coupling portions 18 each formed by the metal pipe 11 such that cut edges of the exposed fibers 2 coincide, in position, with an end face of the metal pipe 11. Each of the coupling portions 18 of one of a pair of the ferrules 27 is coupled, through a sleeve 9, with that of the other one of a pair of the ferrules 27 so as to couple a pair of the ferrules 27 with each other. Subsequently, a clamp housing 22 (FIG. 12) made of elastic material for axially clamping the confronting ferrules 27 to each other is brought into engagement with the flanges 26 of the confronting ferrules 27, whereby the multi-fiber connector K2 is obtained as shown in FIG. 13.

Figure 14A:
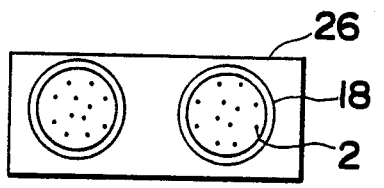
FIGS. 14a, 14b, 14c, 14d, 14e and 14f are views similar to FIG. 11, particularly showing various configurations of its multicore coated fiber, respectively.
Figure 14B:
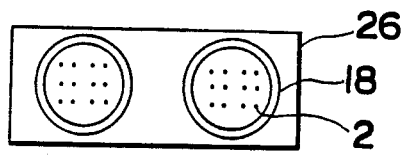
Figure 14C:
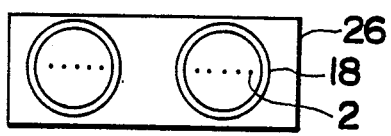
Figure 14D:
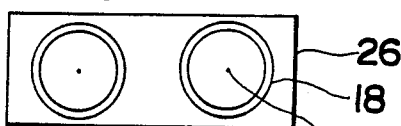
Figure 14E:
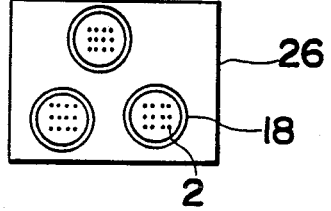
Figure 14F:
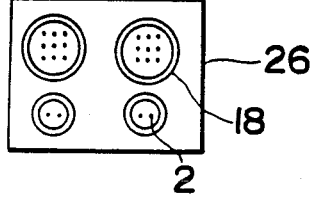

Meanwhile, in this embodiment, each of the ferrules 27 is provided with the two coupling portions 18 each having the multicore coated fiber 1 constituted by the three optical fibers but can be modified variously as shown in FIGS. 14a to 14f. In FIG. 14d, each of the coupling portions 18 ha a single-core coated fiber constituted by a single optical fiber. Furthermore, it can be also so arranged as shown in FIGS. 14e and 14f that each of the ferrules 27 is provided with three or four coupling portions 18 each having the multicore coated fiber 1 constituted by the multiple optical fibers such that the multiple optical fibers of the coupling portions 18 axially extend in parallel with one another. It was found in the present invention that each of the coupling portions 18 having an outside diameter of 2.5 mm is capable of accommodating up to 20 optical fibers.

Hereinbelow, a method of manufacturing the ferrules 27 for the multi-fiber connector K2, according to the present invention will be described with reference to FIG. 15. A molding die 23 for molding a pair of the ferrules 27 of the optical connector K2 is constituted by, for example, two die portions split in its longitudinal direction. In the molding die 23, each of the ferrules 27 is provided with the two coated fibers 1, the flange 26, the portions 26' for receiving the coated fibers 1 and support portions for supporting the two metal pipes 11. The multiple exposed fibers 2 obtained by removing the coating from each of the coated fibers 1 are inserted through each of the metal pipes 11 so as to be used, in common, for a pair of the ferrules 27 such that the two metal pipes 11 each covering the multiple exposed fibers 2 are bridged in parallel with each other between corresponding portions of the flanges 26 of the confronting ferrules 27 in the molding die 23. Meanwhile, opposite ends of each of the coated fibers 1 are projected out of opposite ends of the molding die 23. Subsequently, after the two die portions of the molding die 23 have been clamped to each other, molding resin 12, for example, expoxy resin is injected into the molding die 23. As shown in FIG. 16, each of the metal pipes 11 may be formed, at a central portion thereof, with a slot or an opening 31 for degassing at the time of molding a pair of the ferrules 27.

Figure 10:
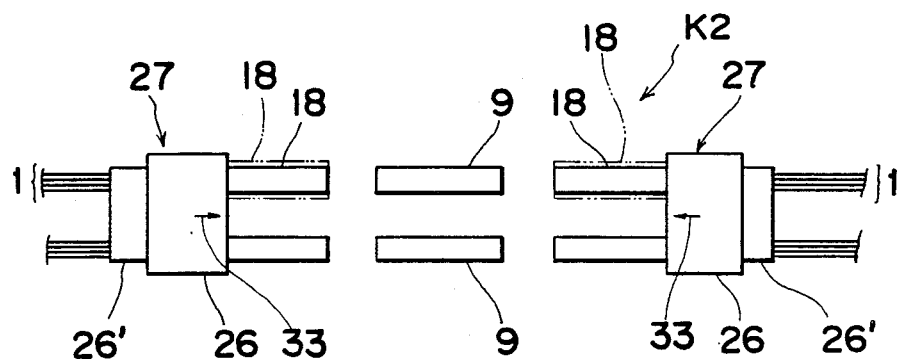
FIG. 10 is an exploded view of a multi-fiber connector according to a second embodiment of the present invention.
Figure 11:
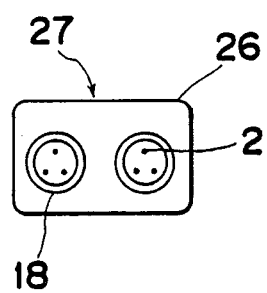
FIG. 11 is a front elevational view of a ferrule employed in the optical connector of FIG. 10.
Figure 12A:
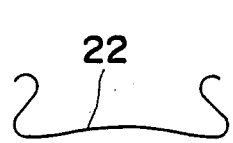
FIGS. 12a and 12b are a side elevational view and a front elevational view of a clamp housing for clamping the optical connector of FIG. 10, respectively.
Figure 12B:
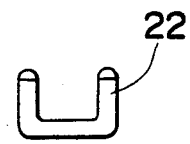

Upon injection of the molding resin 12 into the molding die 23, the two metal pipes 11 are molded integrally with the flanges 26 of the confronting ferrules 27 and the molding resin 12 is sufficiently filled into a space between each of the metal pipes 11 and each of the coated fibers 1 so as to secure each of the coated fibers 1 to each of the metal pipes 11. An integrally molded item thus obtained by using the molding resin 12 is released from the molding die 23 and then, is cut, at the metal pipes 11, into a pair of the ferrules 27. Subsequently, the cut edges of the exposed fibers 2 are ground at the end face of each of the metal pipes 11, whereby a pair of the ferrules 27 each provided with two or more coupling potions 18 each having the multi-core coated fiber 1 can be obtained. In the case where the metal pipes 11 of the coupling portions 18 of one of a pair of the ferrules 27 have different outside diameters so as to correspond to those of the other one of the ferrules 27, respectively as shown by imaginary lines in FIG. 10, it becomes possible to prevent erroneous coupling of a pair of the ferrules 27. Furthermore, to this end, it can be also so arranged as shown in FIG. 10 that a mark 33 for indicating a coupling direction of a pair of the ferrules 27 is provided on each of the ferrules 27 at the time of molding the ferrules 27.

Subsequently, a pair of the sleeves 9 are employed. The two coupling portions 18 of each of a pair of the ferrules 27 are inserted into the sleeves 9, respectively such that the two coupling portions 18 of one of the ferrules 27 confront the two coupling portions 18 of the other one of the ferrules 27, respectively. Then, the flanges 26 of the confronting ferrules 27 are so supported by the clamp housing 22 as to be depressed towards each other, whereby the optical connector K2 is obtained.

A pair of the sleeves 9 can be replaced by a housing 32 molded integrally with a pair of the sleeves 9 as shown in FIG. 17. Each of the sleeves 9 may be further replaced by a split metal sleeve or a ceramic sleeve. Meanwhile, each of the metal pipes 11 may be formed, at its central portion, with a reduced diameter portion 30 as shown in FIG. 15. In this case, even if burrs are produced on the cut edge of the reduced diameter portion 30 of each of the confronting metal pipes 11, the burrs of the reduced diameter portion 30 are held out of contact with each of the sleeves 9 when the confronting metal pipes 11 are fitted into each of the sleeves 9, so that the confronting metal pipes 11 can be smoothly fitted into each of the sleeves 9. In the same manner as the first embodiment, the coated fiber 1 may be provided, at the exposed fibers 2, with a fusion bonding point 19 as shown in FIG. 15. In this case, after molding of a pair of the ferrules 27 has been performed, the molded item may be cut, at its two portions interposing therebetween the fusion bonding point 19 and spaced 3 to 5 mm from each other, into a pair of the ferrules 27 so as to remove the fusion bonding point 19 from the ferrules 27.

As is clear from the method of the present invention of manufacturing a pair of the ferrules 27, the molded item is cut into a pair of the ferrules 27 in the state where the exposed fibers 2 are secured to each of the metal pipes 11. Accordingly, when the ferrules 27 are coupled with each other as the optical connector K2, the cut edges of the confronting metal pipes 11 substantially coincide with each other. More specifically, since each of the ferrules 27 has at least two metal pipes 11 molded integrally with the flange 26, the two metal pipes 11 each extending in the axial direction of the coated fiber 1 contribute greatly towards positioning of each of the ferrules 27 at the time of coupling of a pair of the ferrules 27.

In the optical connector K2 described above, each of the two metal pipes 11 has a single-core coated fiber or a multicore coated fiber. However, it can be also so arranged that one of the metal pipes 11 is not provided with the coated fiber so as to be used only for positioning each of the ferrules 27. Furthermore, it is also possible to further increase the number of the coupling portions 18. Moreover, the confronting ferrules 27 are not necessarily required to be disposed horizontally in the molding die 23, in which case the molding die 23 is split in its longitudinal direction.

Then, one example of the optical connector K2 employing two coupling portions 18 each having a tape type multicore coated fiber composed of five optical fibers is described, with each tape having a width of 1.6 mm and a thickness of 0.6 mm. The coated fiber is inserted through a metal pipe made of stainless steel and having an outside diameter of 2.499±0.001 mm by removing therefrom a coating of 20 mm in length. Subsequently, integral molding of a pair of the ferrules for the optical connector K2 is performed in the molding die by using low-pressure epoxy resin. The integrally molded item is released from the molding die and then, cut, at its central portion, into a pair of the ferrules. After the cut edges of a pair of the ferrules have been ground, a pair of the metal pipes of each of the ferrules are, respectively, fitted into a pair of the sleeve 9 of an inside diameter of 2.496±0.001 mm molded integrally with the housing 32 (FIG. 17). By using the optical connector K2 thus obtained, a transmission loss at the optical connector K2 was examined.

In a total of ten optical connectors K2, namely, coupling of 100 optical fibers (5 optical fibers×2 sleeves×10), it was found that the transmission loss at the optical connector K2 is remarkably small, i.e., 0.23 dB on the average, 0.52 dB at its maximum and 0.03 dB at its minimum by using matching agent and the flange 26 of 7 mm in length. Meanwhile, in the case where the coupling portions 18 are deviated from a horizontal centerline L of the flange 26 as shown in FIG. 18, it becomes possible to easily prevent a pair of the ferrules from being erroneously coupled with each other reversely. In order to axially clamp a pair of the ferrules to each other, the clamp housing 22 of FIG. 12 was employed. Furthermore, in this example, a rubber boot for protecting the coated fiber is attached to a rear portion of each of the ferrules.

In another example of the optical connector K2, two coupling portions each having a multicore coated fiber composed of three single-mode optical fibers are employed. In a total of ten optical connectors K2, it was found that the transmission loss at the optical connector K2 desirably assumes a small value of 0.20 dB on the average.

As is clear from the foregoing description, in the optical connector according to the second embodiment of the present invention, the exposed fibers to be optically coupled with the mating exposed fibers at a subsequent step are secured in a plurality of the metal pipes by integral molding such that a plurality of the metal pipes position, as the coupling portions, each of a pair of the ferrules at the time of coupling of a pair of the ferrules. Accordingly, in accordance with the present invention, since the confronting coated fibers can be joined to each other accurately at a relative position substantially identical with that occupied at the time of the integral molding, the optical connector having a remarkably small transmission loss can be obtained without the need for carefully positioning a plurality of the exposed fibers at the time of the integral molding. Assuming that each of a pair of the ferrules has two metal pipes each having an outside diameter of 2.5 mm and each of the metal pipes accommodates a multicore coated fiber composed of ten optical fibers, each of the ferrules requires only an area of 1 mm² per optical fiber, which is one-tenth to one-fifth of that of prior art optical connectors.

Figure 2A:
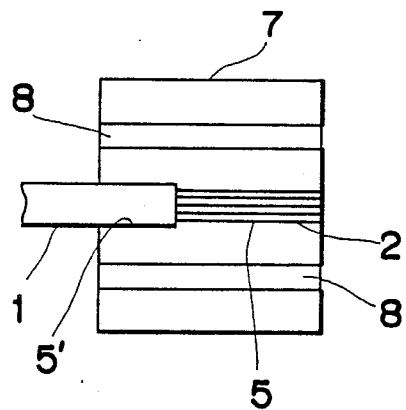
FIGS. 2a and 2b are a longitudinal sectional view and a front elevational view of a ferrule of a prior art multi-fiber connector, respectively (already referred to)
Figure 2B:
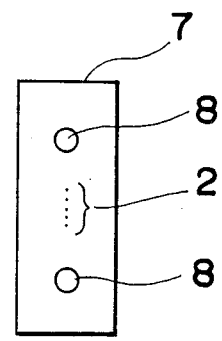

Furthermore, in accordance with the present invention, it becomes possible to obtain the multicore coated fiber composed of three single-core optical fibers, which constitutes a concentrated configuration three times that of prior art optical connectors. A transmission loss at the known single-mode optical connectors was at best 0.6 dB on the average even if matching agent is employed. On the other hand, in the present invention, it becomes possible to easily obtain a transmission loss of 0.2 dB at the optical connector. Namely, in the present invention, since a plurality of the metal pipes each having the multicore coated fiber secured thereto position, as the coupling portions, each of the confronting ferrules without the need for provision of the coupling pins of the prior art ferrule of FIG. 2, the flange of each of the ferrules can be made small in size, thus making the optical connector compact in size.

Moreover, in accordance with the present invention, since a pair of the ferrules can be coupled with each other by merely using the sleeves and the clamp housing, the optical connector is simplified in structure and can be manufactured at low cost.

In addition, in accordance with the present invention, since a plurality of the sleeves can be formed integrally with the housing, it is possible to operate the optical connector with much each.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A multi-fiber connector for joining exposed fiber ends of multicore coated fibers each having multiple optical fibers, comprising:

a pair of ferrules each of which includes a plurality of said multicore coated fibers and a plurality of metal pipes molded integrally with each other by using molding resin such that said metal pipes act as a plurality of coupling portions of each of said ferrules, respectively;

said multicore coated fibers being, respectively, extended through said metal pipes such that said exposed fiber ends of each of said multicore coated fibers are disposed at a distal end of each of said metal pipes;

a plurality of sleeves into which said metal pipes of one of said ferrules and said metal pipes of the other one of said ferrules are fitted from opposite ends of said sleeves, respectively; and a housing member for axially clamping said ferrules to each other.

2. A multi-fiber connector as claimed in claim 1, wherein said metal pipes of each of said ferrules have different outside diameters.

3. A multi-fiber connector as claimed in claim 1, wherein each of said ferrules is provided with a mark for indicating a coupling direction of said ferrules.

4. A multi-fiber connector as claimed in claim 1, wherein said coupling portions of each of said ferrules are so disposed in each of said ferrules as to indicate a coupling direction of said ferrules.

5. A multi-fiber connector as claimed in claim 1, wherein said sleeves are accommodated in a housing.

* * * * *